United States Patent [19]

Tsuchida et al.

[11] Patent Number: 5,575,254

[45] Date of Patent: Nov. 19, 1996

[54] INDUCTION SYSTEM FOR ENGINE

[75] Inventors: Naoki Tsuchida; Hiroyuki Tsuzuku, both of Iwata, Japan

[73] Assignee: Yamaha Hatsudoki Kabushiki Kaisha, Iwata, Japan

[21] Appl. No.: 286,670

[22] Filed: Aug. 5, 1994

[30] Foreign Application Priority Data

Aug. 9, 1993 [JP] Japan ................................ 5-197479

[51] Int. Cl.$^6$ .................................................. F02B 31/00
[52] U.S. Cl. .................................................. 123/308
[58] Field of Search ...................................... 123/308, 432

[56] References Cited

U.S. PATENT DOCUMENTS

| | | |
|---|---|---|
| 5,165,374 | 11/1992 | Chapman et al. ........................ 123/308 |
| 5,230,317 | 7/1993 | Nonogawa et al. ...................... 123/308 |
| 5,311,848 | 5/1994 | Isaka et al. ............................... 123/308 |

FOREIGN PATENT DOCUMENTS

| | | |
|---|---|---|
| 0390589 | 10/1990 | European Pat. Off. . |
| 0558081 | 9/1993 | European Pat. Off. . |
| 4233640 | 4/1993 | Germany . |
| 62-90937 | 6/1987 | Japan . |
| 4081522 | 3/1992 | Japan ...................................... 123/308 |

OTHER PUBLICATIONS

European Search Report dated Oct. 19, 1994.
Patent Abstract of Japan—vol. 16, No. 380 (M–1295) 14 Aug. 1992 & JP-A-04 124 426 (Mazda) 24 Apr. 1992.
Patent Abstract of Japan—vol. 16, No. 82 (M–1215) 27 Feb. 1992 & JP-A-03 264 727 (Mazda) 26 Nov. 1991.
Patent Abstract of Japan—vol. 14, No. 545 (M–1054) 4 Dec., 1990 & JP-A-02 230 920 (Fuji Heavy Ind Ltd) 13 Sep. 1990.

*Primary Examiner*—Erick R. Solis
*Attorney, Agent, or Firm*—Knobbe, Martens, Olson & Bear

[57] ABSTRACT

An induction system and combustion chamber configuration for a multiple valve internal combustion engine wherein a tumble action is generated in the combustion chamber about an axis that extends transversely relative to the axis of the cylinder bore and which tumble axis is disposed so as to be substantially at the center of the combustion chamber volume when the piston is at its maximum speed during the compression stroke. This is accomplished by changing the lift, effective flow areas, and/or size of the intake passages.

15 Claims, 4 Drawing Sheets

INDUCTION SYSTEM FOR ENGINE

BACKGROUND OF THE INVENTION

This invention relates to an induction system for an engine, and more particularly to an improved induction system for a multi-valve internal combustion engine.

It has been recognized that there are certain advantages in promoting turbulence in the combustion chamber, particularly under at least some running conditions and loads. One type of turbulence which is generated in the combustion chamber, generally through the use of the induction system, is "swirl." Swirl is a rotary motion occurring about an axis that is either coincident with or parallel to the cylinder bore axis. Another type of motion, which has been proven to be more effective under at least some running conditions, is called "tumble." Tumble is also a swirling motion in the combustion chamber, but tumble rotates about an axis that is disposed transversely to the cylinder bore axis. That is, the intake charge is delivered into the cylinder so as to flow toward one side thereof, impinge upon the cylinder, be directed downwardly to strike the head of the piston, and be redirected back toward the other side of the cylinder so as to generate this tumbling motion. Like swirl, tumble is generated primarily in the configuration of the induction system.

In addition to the desirability of introducing some motion to the intake charge, the induction system also should be capable of introducing adequate air flow for maximum engine output. This gives rise to the use of multiple intake valves, and although two valves per cylinder are common, three intake valves per cylinder may be more desirable under a number of circumstances.

However, with the use of three valves per cylinder, the valve placement frequently is such that some of the intake valves can be used to create a tumble action, but the remaining intake valves may cause a reverse tumble action that opposes the tumble from the first valve or valves. Although this reverse action may be desirable for controlling the speed of tumble, it is also important to ensure that the desired rate of tumble is accomplished.

One advantage of tumble motion is that the tumble action is accelerated as the piston approaches top dead center. That is, the path which the air must flow when completing its circle decreases as the piston approaches top dead center. As a result, the rate of tumble increases.

It is, however, also important to ensure that the tumble is not excessive, because too much tumble can produce results that are not desirable. It has been found that the best performance, under at least some running conditions, can be accomplished when the center or axis about which the tumble occurs is the center of the volume of the combustion chamber when the piston is traveling at a maximum speed.

It is, therefore, a principal object of this invention to provide an improved induction system for an engine for generating tumble.

It is another object of this invention to provide an improved induction system for a multi-valve engine wherein the desired degree of tumble can be obtained.

It is a still further object of this invention to provide an improved induction system for an internal combustion engine wherein the optimum tumble condition can be achieved, even when using three intake valves per cylinder.

SUMMARY OF THE INVENTION

This invention is adapted to be embodied in an induction system for an internal combustion engine having a cylinder defining a cylinder bore having an axis. A piston reciprocates in the cylinder bore, and a cylinder head is affixed to the cylinder and has a surface that defines with the cylinder bore and the piston a combustion chamber, the volume of which varies cyclically upon reciprocation of the piston. Intake port means communicate with the combustion chamber for delivering a charge to the combustion chamber. Means cooperate with the intake port means for causing the charge delivered to the combustion chamber to assume a tumble motion rotating about an axis that extends transversely to the cylinder bore axis and which tumble axis is disposed substantially at the center of the combustion chamber volume when the piston is traveling at its maximum speed.

DETAILED DESCRIPTION OF THE PREFERRED EMBODIMENT OF THE INVENTION

Figure 1:
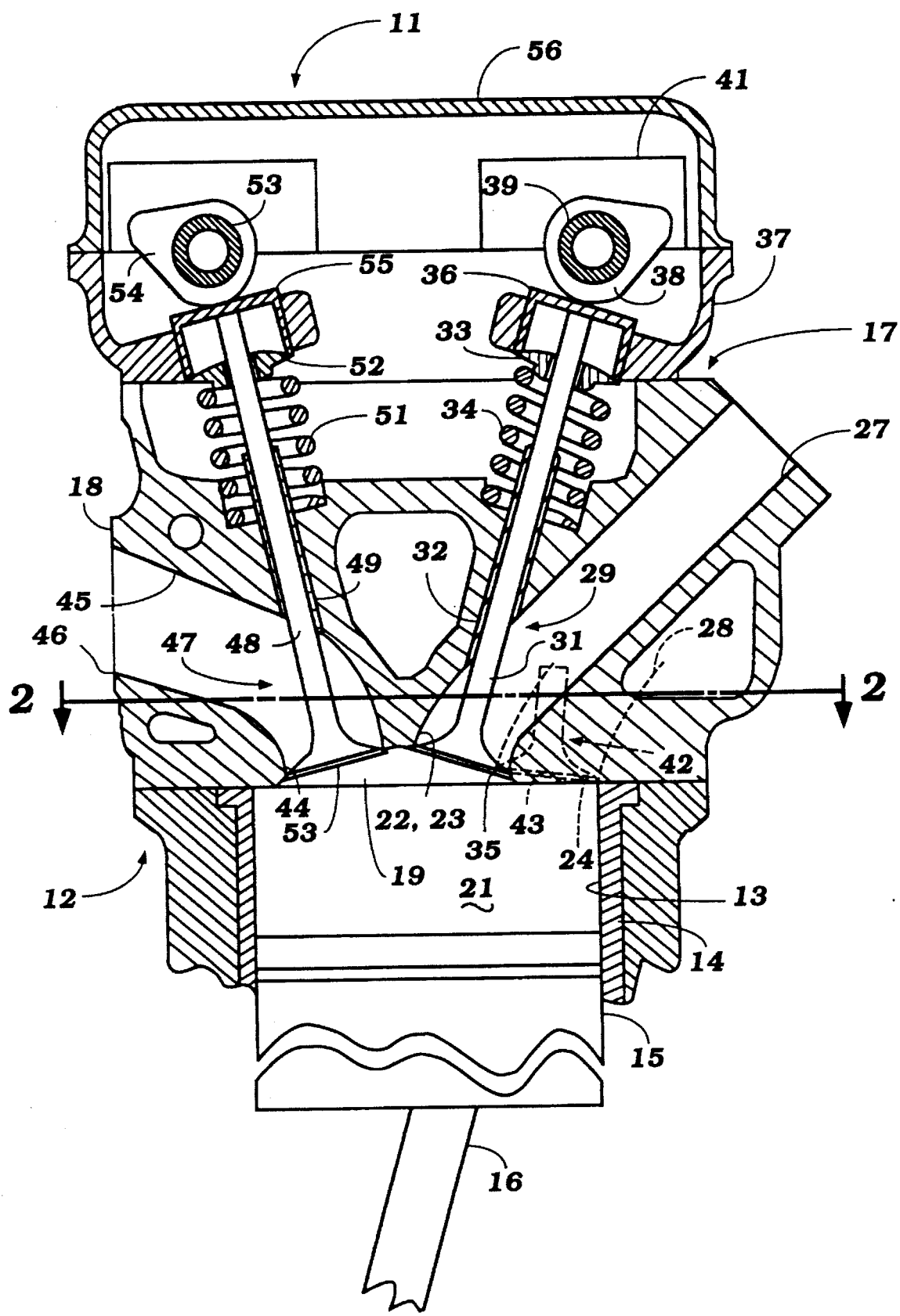
FIG. 1 is a cross-sectional view taken through a single cylinder of a multiple cylinder internal combustion engine constructed and operated in accordance with an embodiment of the invention.
Figure 2:
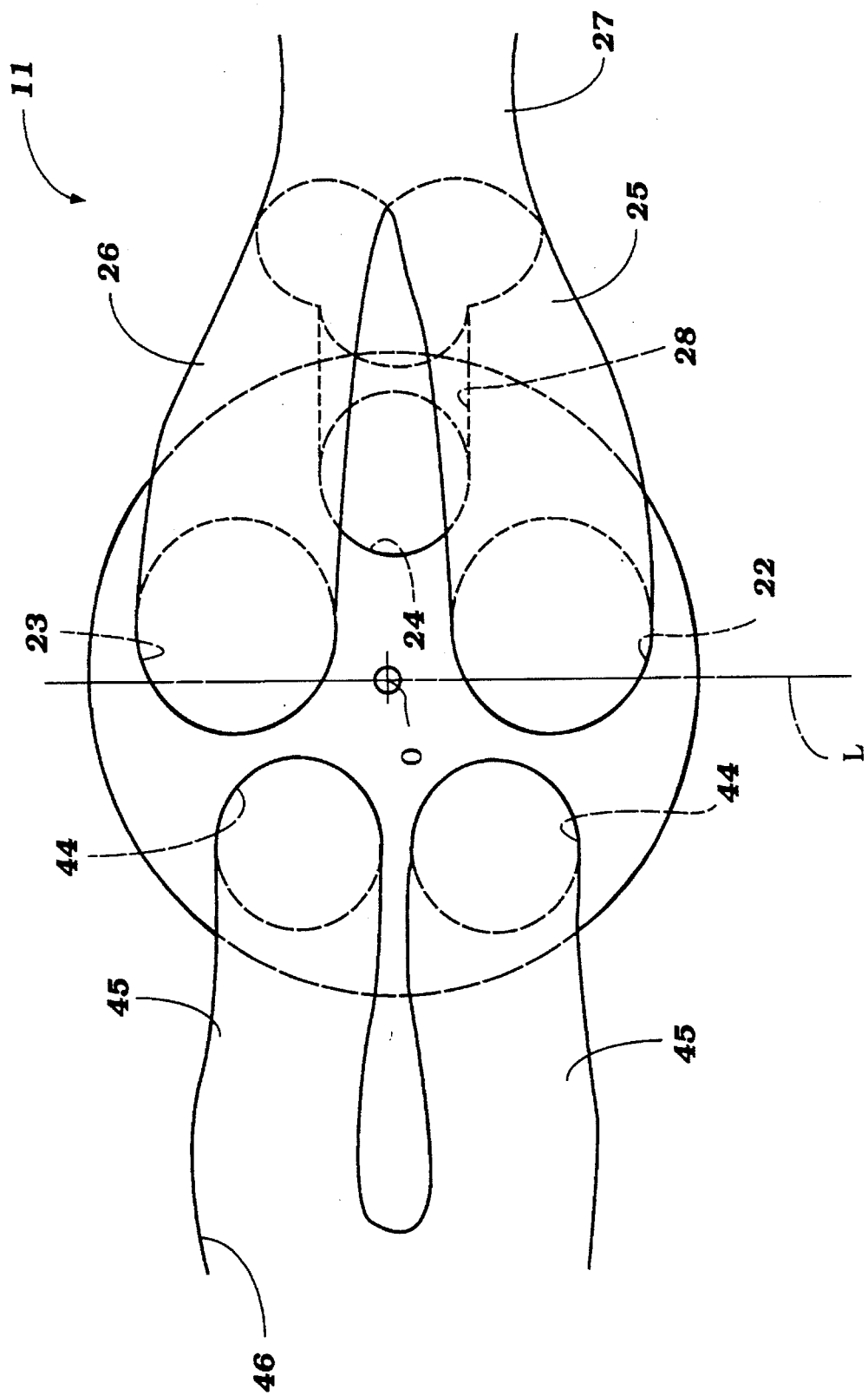
FIG. 2 is a cross-sectional view of the cylinder head taken generally along the line 2—2 of FIG. 1.

Referring first to FIGS. 1 and 2, an internal combustion engine constructed and operated in accordance with an embodiment of the invention is identified generally by the reference numeral 11. The engine 11 is shown partially and primarily through cross-sectional views taken through a single cylinder of the engine. Since the invention deals primarily with the combustion chamber and the induction system for delivering the intake charge to the combustion chamber, only this portion of the single illustrated cylinder is shown and will be described in detail. Where components of the engine are not illustrated or described, they may be considered to be of any conventional type. Also, although the invention is illustrated in conjunction with an in-line type of engine, it will be readily apparent to those skilled in the art how the invention may be employed with multiple cylinder engines having any orientation of the cylinders, such as V-type, opposed, etc.

The engine 11 includes a cylinder block, indicated generally by the reference numeral 12 and which is shown only partially for the aforenoted reasons. A cylinder bore 13 is formed in the cylinder block 12, for example, by means of liners 14, which may be cast, pressed, or otherwise inserted. Pistons 15 reciprocate in the cylinder bores 13 and are connected by means of connecting rods 16 to the crankshaft (not shown) in a well-known manner.

A cylinder head assembly, indicated generally by the reference numeral 17, is affixed to the cylinder block 12 in a known manner. This cylinder head assembly 17 includes a main cylinder head casting 18, which has a plurality of recessed surfaces 19 that are each disposed in closing relationship to a respective one of the cylinder bores 13. The recess 19, the cylinder bore 13, and the head of the pistons 15 define the complete combustion chamber, indicated by the reference numeral 21, the volume of which varies cyclically during the reciprocation of the piston 15, as is well known in the art.

An induction system is provided for delivering an intake charge to the combustion chamber 21. This induction system includes a pair of side intake valve seats 22 and 23, which are disposed so that they lie in part on a plane, indicated at L, which plane passes through the cylinder bore axis 0 and contains it. This plane L extends generally parallel to and may contain the axis of rotation of the crankshaft.

A third intake valve seat 24 is also formed in the cylinder head recess surface 19, but is disposed further from the plane L than the intake valve seats 22 and 23, and also lies primarily on the side of the plane L as the main portion of the side intake valve seats 22 and 23.

A pair of side intake passages 25 and 26 extend through the cylinder head 18 on the side of the plane L as the main portion of the intake valve seats 22, 23, and 24 and terminates at the side valve seats 22 and 23. The intake passages 25 and 26 have a common Siamese portion 27, which extends outwardly through the outer surface of the cylinder head 18 for connection to an appropriate intake manifold and charge-forming system, if direct cylinder injection is not employed.

A third intake passage 28 extends through the cylinder head 18 on the same side of the plane L as the intake passages 25 and 26, and also merges into the common section 27 so that one induction system serves all of the intake passages 25, 26, and 28 through the common portion 27.

A pair of side intake valves, only one of which appears in the drawings but which are indicated generally by the reference numeral 29, have respective stem portions 31 that are slidably supported for reciprocation in valve guides 28 that are pressed or otherwise fixed to the cylinder head casting 18. These valve guides 32 define reciprocal axes for the intake valves 31, which lie in a common plane, are parallel to each other, and which common plane is disposed at an acute angle to the plane L.

Keeper retainer assemblies 33 are affixed to the upper ends of the valve stems 31 and are engaged by coiled compression springs 34 for urging the intake valves 29, and specifically head portions 35 thereof, to a closed position with the valve seats 22 and 23.

Tappet bodies 36 are slidably supported within a cam carrier 37, which is affixed to the cylinder head casting 18 and forms another portion of the cylinder head assembly 17. These tappets are engaged by cam lobes 38 of an intake camshaft 39 that is journaled for rotation by the cam carrier 37 and bearing caps 41 affixed thereto in a well-known manner. The camshaft 39 is driven from the crankshaft by any suitable valve train and operates at one-half of crankshaft speed, as is well known in this art.

A third center intake valve, shown only in section in FIG. 1, is indicated generally by the reference numeral 42 and has a head portion 43 that cooperates with the center valve seat 24 for controlling the flow through the intake passage 28 into the combustion chamber 21. This center intake valve 42 has its stem portion supported for reciprocation by a valve guide like the side intake valves 29, but its axis of reciprocation is disposed at a less acute angle to the plane L. Also, the head portion 43 of the center intake valve 42 is smaller in diameter than the head portions 35 of the side intake valves 29 for a reason which will be described. Like the side intake valves 29, the center intake valve 42 is operated by a lobe (not shown) of the camshaft 39 either by direct action with a thimble tappet like the tappet 35 or through a suitable rocker arrangement. The configuration illustrated lends itself more to direct tappet actuation, but it is understood that the manner in which the intake valves 29 and 42 are opened and closed forms no part of the invention, although the timing of their opening and closing does.

A pair of exhaust valve seats 44 are formed in the recess 19 on the side of the plane L opposite the main portion of the intake valve seats 22 and 23 and the intake valve seat 24. The exhaust valve seats 44 are formed at the end of a pair of exhaust passages 45, which extend through the side of the cylinder head casting 18 opposite the intake passages relative to the plane L. These exhaust passages 45 are Siamesed and have a common discharge end 46 opening through the exhaust side of the cylinder head casting 18 to which an appropriate exhaust system including an exhaust manifold (not shown) is attached.

A pair of exhaust valves, indicated generally by the reference numeral 47, have stems 48 that are supported for reciprocation in valve guides 49 fixed suitably in the cylinder head casting 18. In the illustrated embodiment, the valve guides 49 define parallel reciprocal axes that lie in a common plane that is disposed at an acute angle to the plane L and which acute angle is between the angle of reciprocation of the side intake valves 29 and that of the center intake valves 42.

Coiled compression springs 51 encircle the exhaust valve stems 48 and engage keeper retainer assemblies 52 affixed thereto for urging exhaust valve heads 53 thereof into sealing engagement with the exhaust valve seats 44.

An exhaust camshaft 53 has cam lobes 54 that are engaged with thimble tappets 55 slidably supported in the cam carrier 37 for operating the exhaust valves 47. The exhaust camshaft 53 is, like the intake camshaft 39, driven at one-half crankshaft speed by any suitable valve train.

The valve mechanism thus far described is enclosed by means of a cam cover 56, which is affixed to the cam carrier 37 and cylinder head casting 18 and forms the remainder of the cylinder head assembly 17.

A spark plug is mounted in the cylinder head casting 18 and has its gap disposed generally on the cylinder head bore axis O for firing the charge that has been delivered to the combustion chamber 21 through the induction system, as described, prior to its discharge through the exhaust system.

Figure 3:
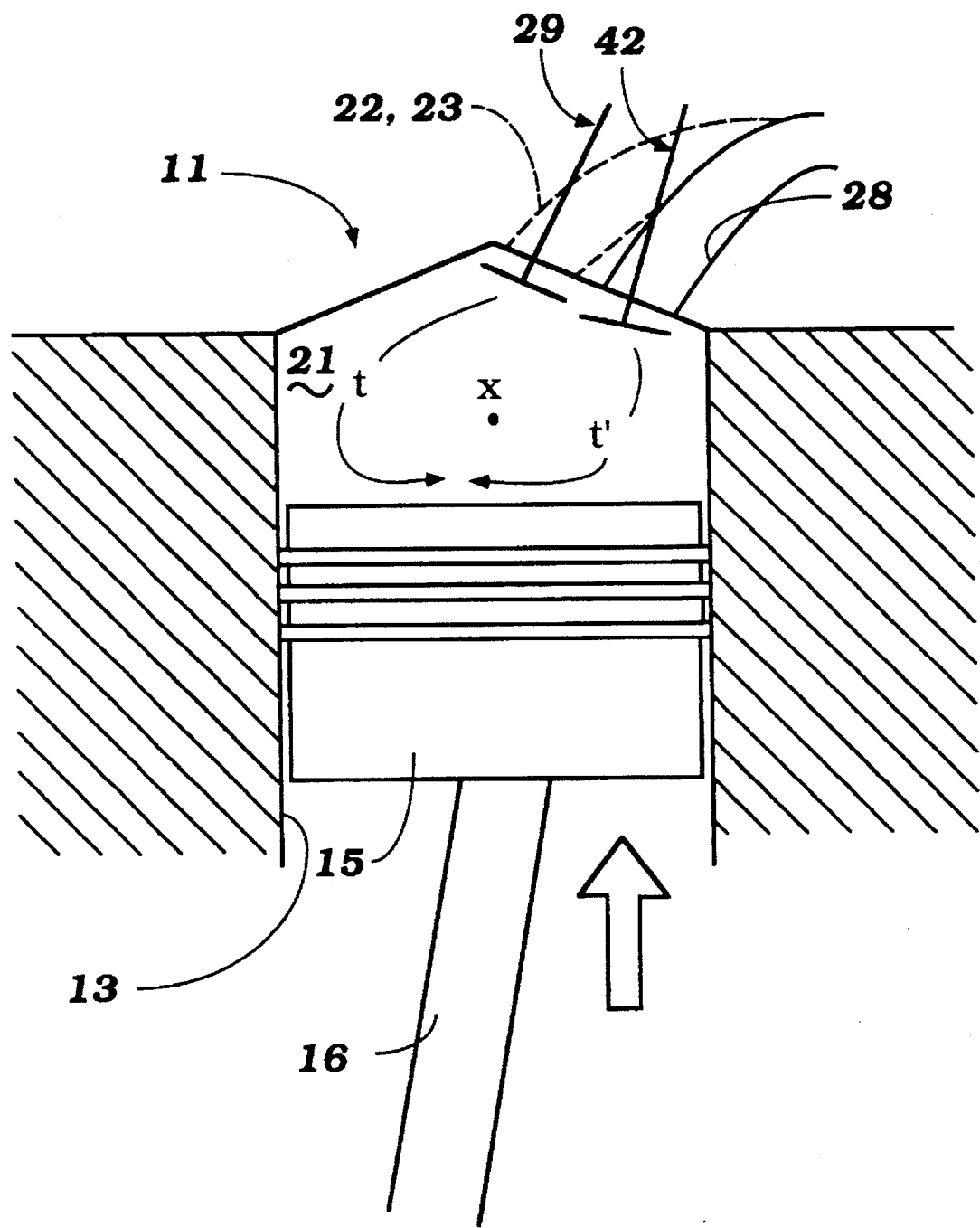
FIG. 3 is a view, in part similar to FIG. 1, on a smaller scale and showing the tumble action that occurs in the cylinder when the piston is beginning its compression stroke and while the intake valves are still open.

As will now be described by particular reference to FIGS. 3 and 4, the induction system is designed so as to generate a controlled tumble action in the combustion chamber 21. This may be understood by reference to FIG. 3, wherein the condition in the combustion chamber when the intake valves 29 and 42 are open is depicted with the figure showing a position when the piston 15 is beginning the compression stroke, but while the intake valves 29 and 42 are still open. It will be noted that the intake passages 27 and valve seats 22 and 23 are disposed so that the charge entering the combustion chamber will flow toward the exhaust valve seats 44 in a direction indicated by the arrow t in this figure. This charge flows toward the cylinder bore 13 and then is directed downwardly to impact on the head of the piston 15 and then flow back toward the other side of the cylinder bore in a circular fashion about an axis X that extends transversely to the cylinder bore axis O.

The center intake passage 28 and its valve seat 24 are disposed so that the flow entering the combustion chamber 21 will be directed in a generally axial direction. However, when this charge strikes the head of the piston 15, it will be redirected toward the opposite side of the cylinder bore 13, and thus generate a reverse tumble action t'. That is, the tumble action t is in a counterclockwise direction while the tumble action t' is in a clockwise direction so as to oppose each other. This opposing flow is utilized so as to create an overall tumble action in the direction of the arrow t, but at a somewhat smaller magnitude, and which tumble action is designed so as to achieve its center of tumble X at a point that is disposed at the center of the volume of the combustion chamber 21 when the piston 15 is moving upwardly at its maximum velocity.

Figure 4:
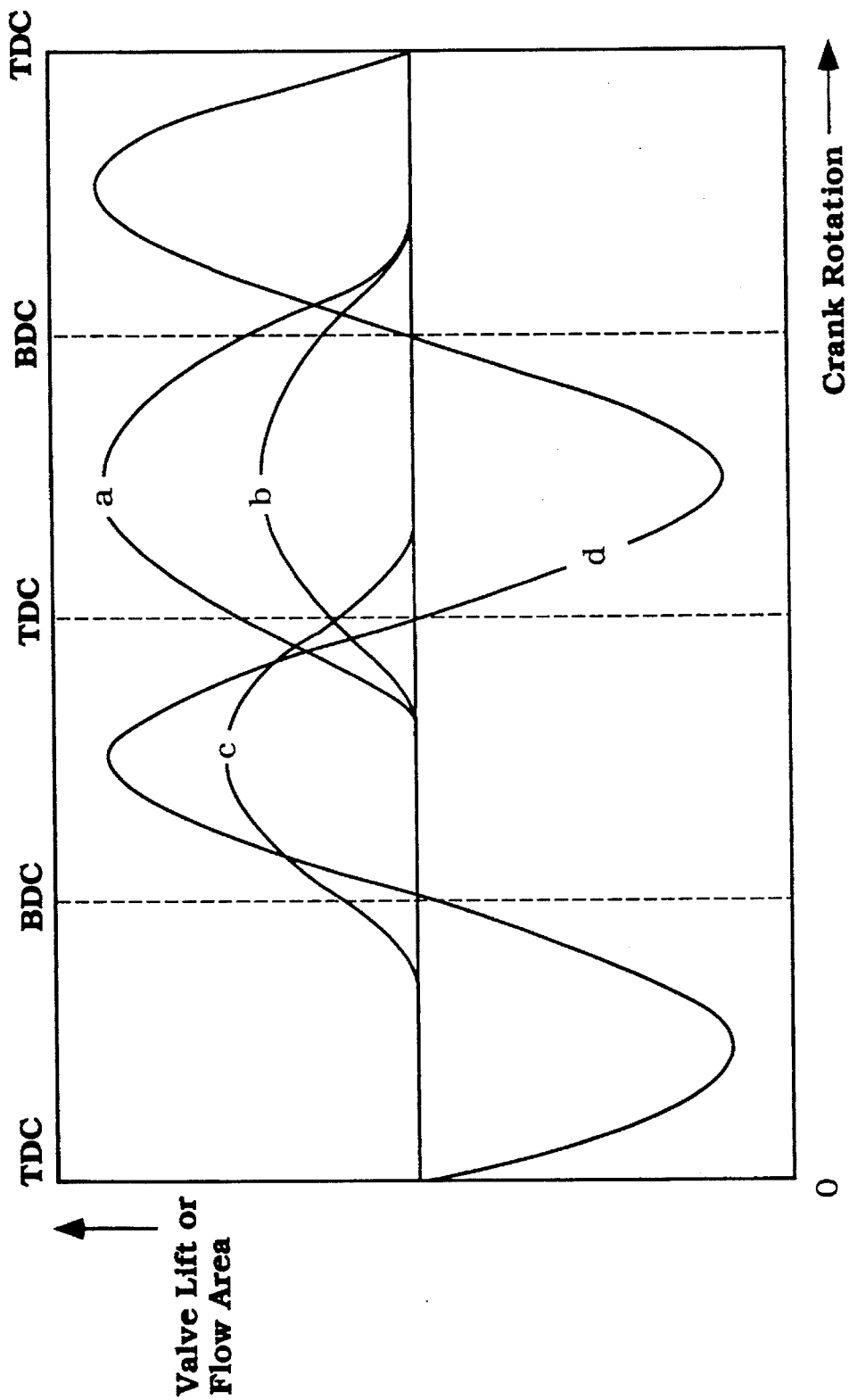
FIG. 4 is a graphical view showing the piston speed and valve lift or opening during a full cycle of engine operation.

This may be understood best by reference to FIG. 4, which is a timing diagram showing a single cycle of operation (two revolutions of the crankshaft) with the lift or opening area of the side intake valves 29 being shown by the curve a, that of the center intake valve 42 being shown by the curve b, the corresponding lift or flow area of the exhaust valves 47 being indicated by the curve c, and the piston velocity being indicated by the curve d. In the illustrated embodiment, the timing of the opening and closing of the side intake valves 29 and that of the center intake valve 42 are the same, but the rate of opening or lift, or alternatively the flow area, increases and is much greater. As a result of this and of the valve size, the desired relative tumble actions and resulting tumble action as aforenoted as being desirable can be achieved. As should be readily apparent, this can be achieved by changing either the relative diameters of the valve heads 35 and 43, the amount of lift, the timing of the valve events, or all of the above. The important thing is that for a given engine, the tumble action generated should be such that the center of tumble is coincident with the center of the combustion chamber volume when the piston is at its maximum upward stroke, as indicated in the fourth quadrant of FIG. 4, which occurs at approximately one-half of the piston travel between bottom dead center and top dead center. It will be readily apparent to those skilled in the art that any of the number of ways in which this can be achieved is possible.

It should be readily apparent from the foregoing description that the described induction system and combustion chamber configuration permits the obtaining of the desired tumble rate, while still permitting the use of three intake valves per cylinder and large effective flow areas. Of course, the foregoing description is that of a preferred embodiment of the invention, and various changes and modifications may be made without departing from the spirit and scope of the invention, as defined by the appended claims.

We claim:

1. An induction system for an internal combustion engine having a cylinder defining a cylinder bore having an axis, a piston reciprocating in said cylinder bore, a cylinder head affixed to said cylinder and having a surface defining with said cylinder bore and said piston a combustion chamber, the volume of which varies cyclically upon reciprocation of said piston within said cylinder bore, intake port means cooperating with said combustion chamber for delivering a charge to said combustion chamber, and means cooperating with said intake port means for causing the intake charge delivered to said combustion chamber to assume a tumble motion rotating about a tumble axis that extends transversely to said cylinder bore axis which tumble axis is disposed substantially at the center of said combustion chamber volume when said piston is traveling from its bottom dead center position toward its top dead center position during the compression stroke and at its maximum speed.

2. The induction system of claim 1, further including intake valve means for controlling the flow through said intake port means, said intake valve means functioning to effect the tumble action.

3. The induction system of claim 2, wherein the tumble action is effected by the configuration of intake passages leading to the intake port means, the intake port means, the size of the intake port means, and the timing and lift of the intake valve means.

4. The induction system of claim 3, wherein there are at least two intake ports, and the intake ports have different effective diameters.

5. The induction system of claim 3, wherein there are at least two intake port and two intake valves, and the effective opening area of the intake valves is different.

6. The induction system of claim 1, wherein the intake port means comprise three intake ports, two comprising side intake ports and disposed so that they are intersected by a plane containing the axis of the cylinder bore but lie substantially on one side of said plane and the third of which lies completely on the one side of the plane and comprises a center valve port.

7. The induction system of claim 6, further including three intake valves each controlling the flow through a respective intake port, said valves functioning to effect the tumble action.

8. The induction system of claim 7, wherein the tumble action is effected by the configuration of intake passages leading to the intake ports, the intake ports, the size of the intake ports, and the timing and lift of the intake valves.

9. The induction system of claim 8, wherein at least two of the intake ports, and the intake valves have different effective diameters.

10. The induction system of claim 8, wherein at least two intake ports and two intake valves, have different effective opening areas.

11. The induction system of claim 6, wherein there are a pair of side intake passages, each serving a respective one of the side intake ports and are disposed for creating a tumble action in a first direction around the tumble axis, and a center intake passage serving the center intake port and configured so as to generate a reverse tumble action in the opposite direction around the tumble axis.

12. The induction system of claim 11, further including intake valves for controlling the flow through the intake port, said valves functioning to effect the tumble action.

13. The induction system of claim 12, wherein the tumble action is effected by the configuration of intake passages leading to the intake ports, the intake port means, the size of the intake port, and the timing and lift of the intake valves.

14. The induction system of claim 13, wherein at least two of the intake ports have different effective diameters.

15. The induction system of claim 13, wherein at least two of the intake valves have different lift.

\* \* \* \* \*